United States Patent
Mukaide

(10) Patent No.: US 7,732,951 B2
(45) Date of Patent: Jun. 8, 2010

(54) MOVING-MAGNET TYPE LINEAR MOTOR

(75) Inventor: Naomasa Mukaide, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 303 days.

(21) Appl. No.: 12/022,398

(22) Filed: Jan. 30, 2008

(65) Prior Publication Data
US 2008/0218004 A1  Sep. 11, 2008

(30) Foreign Application Priority Data
Mar. 6, 2007  (JP)  ............ 2007-055540

(51) Int. Cl.
*H02K 41/00* (2006.01)
(52) U.S. Cl. ............... 310/12.29; 310/12.21
(58) Field of Classification Search .......... 310/12.01, 310/12.05, 12.15, 12.21, 12.29, 52, 58
See application file for complete search history.

(56) References Cited

U.S. PATENT DOCUMENTS

| | | | | |
|---|---|---|---|---|
| 5,998,889 | A * | 12/1999 | Novak | 310/12.29 |
| 6,555,936 | B1 * | 4/2003 | Tanaka et al. | 310/12.29 |
| 6,608,407 | B2 * | 8/2003 | Kawada | 310/12.02 |
| 6,661,124 | B1 * | 12/2003 | Seki et al. | 310/12.21 |
| 6,664,665 | B2 * | 12/2003 | Hsiao | 310/12.14 |
| 6,717,295 | B2 * | 4/2004 | Hwang et al. | 310/12.29 |
| 6,977,451 | B2 * | 12/2005 | Onishi | 310/12.29 |
| 6,992,410 | B2 * | 1/2006 | Chen et al. | 310/52 |
| 7,057,313 | B2 * | 6/2006 | Buis et al. | 310/12.29 |
| 7,345,384 | B2 * | 3/2008 | Yoshida et al. | 310/12.06 |
| 7,385,317 | B2 * | 6/2008 | Sugita et al. | 310/12.15 |
| 7,446,439 | B2 * | 11/2008 | Aoki et al. | 310/12.25 |

FOREIGN PATENT DOCUMENTS

| | | |
|---|---|---|
| JP | 1-270763 | 10/1989 |
| JP | 7-30585 | 6/1995 |

OTHER PUBLICATIONS

U.S. Appl. No. 12/013,721, filed Jan. 14, 2008, Naomasa Mukaide.

* cited by examiner

*Primary Examiner*—Thanh Lam
(74) *Attorney, Agent, or Firm*—Oblon, Spivak, McClelland, Maier & Neustadt, L.L.P.

(57) ABSTRACT

A moving-magnet type linear motor is provided with cooling blocks which are attached to each of stator bases alongside a coreless coil and which allow coolant to flow therethrough for cooling the coreless coil. Each of the cooling blocks has in a base end portion thereof a fluid passage for flowing coolant and at an extreme end portion thereof a plurality of sheet-like protrusions like fins which are arranged alongside a part of the circumferential surface of the coreless coil with a clearance between each protrusion and the next thereto. Each cooling block is thermally closely jointed with the coreless coil at the extreme ends of the sheet-like protrusions.

6 Claims, 5 Drawing Sheets

Rearward ← → Forward
X-axis Direction

Rearward ←——→ Forward
X-axis Direction

MOVING-MAGNET TYPE LINEAR MOTOR

INCORPORATION BY REFERENCE

This application is based on and claims priority under 35 U.S.C. 119 with respect to Japanese patent application No. 2007-055540 filed on Mar. 6, 2007, the entire content of which is incorporated herein by reference.

BACKGROUND OF THE INVENTION

1. Field of the Invention

The present invention relates to a linear motor for use in various industrial machinery such as, for example, machine tools, electric component mounting apparatus or semiconductor-related apparatus. Particularly, it relates to a moving-magnet type linear motor which is constructed to take a field system as moving element and an armature as stator.

2. Discussion of the Related Art

As a moving-magnet type linear motor which takes a field magnet as moving element and an armature (coreless coils) as stator, there has been known one which is described in Japanese published utility model application No. 07-30585. This is of the construction that a moving-magnet body is configured by fixedly piercing a through shaft member into a holed column permanent magnet and that the through shaft member is axially slidably carried by bearing members so that the moving-magnet body is axially movable inside coreless coils which are in fixed relation with the bearing members. In this device, a propelling force acting on the moving-magnet body is basically in accordance with Fleming's left-hand rule. (Although Fleming's left-hand rule is applicable to the coreless coils, the propelling force given to the moving-magnet body is generated as a reaction or counter-force of the force acting on the coreless coils because the same are provided stationarily.) Thus, contributed to the propelling force is a normal component of magnetic flux of the permanent magnet provided in the moving-magnet body (i.e., a component normal to the axial direction of the permanent magnet).

As a moving-magnet type linear motor of another kind, there has been known one which is described in Japanese unexamined, published patent application No. 1-270763. This is of the polyphase type that a plurality of coreless coils on a stator side apply a propelling force to magnets on a moving member side. Specifically, the coreless coils arranged in the moving direction are secured to stick-like support members at their opposite ends in a direction normal to the moving direction to constitute an elongated stator assembly. The moving member surrounding the elongated stator assembly is movable along the same, and the magnets attached to each of facing interior surfaces of the moving member are located between the support members securing the opposite ends of the coreless coils, to face one-end surfaces and the other-end surfaces of the coreless coils. Pipe conduits for flowing coolant therethrough are provided inside each of the support members in the moving direction, so that the heat generated by drive current applied to the coreless coils can be removed by circulating coolant through the pipe conduits.

However, in the technology of the aforementioned Japanese published utility model application, the moving-magnet body is configured by the column permanent magnet which surrounds the circumferential surface of the through shaft member, and this gives rise to a drawback that the mass of the moving-magnet body increases to result in a poor responsiveness. Further, in the technology of the aforementioned Japanese unexamined, published patent application, the cross-section of each support member in which the pipe conduit is provided for flowing coolant therethrough is so larger as to make the heat from the coreless coils spread over the whole of each support member, and this gives rise to a drawback that the heat conduction between the coreless coils and the coolant is low in efficiency. In addition, consideration should have been taken into a universal problem that when a metal member moves across magnetic flux, eddy current is generated to decrease the propelling force for the moving member.

SUMMARY OF THE INVENTION

It is therefore a primary object of the present invention to provide a moving-magnet type linear motor in which a movable member is light in weight and high in responsiveness and which is capable of removing heat generated by drive current applied to coreless coils and of efficiently generating a powerful propelling force as a result of suppressing the generation of eddy current.

Briefly, according to the present invention, there is provided a moving-magnet type linear motor, which comprises a magnet yoke forming an even-number polygonal cylinder with a plurality of flat walls and movable in the axial direction of the even-number polygonal cylinder, a plurality of magnet constructs respectively attached to outer surfaces of the flat walls of the magnet yoke and composed of a plurality of permanent magnets, a stator base provided to surround the magnet yoke, a plurality of coreless coils attached to the stator base and arranged to respectively face the plurality of magnet constructs each with a magnetic clearance relative to the associated magnet construct, and at least one cooling member attached to the stator base to follow a part of the circumferential surface of the associated coreless coil and allowing coolant to flow inside for cooling the associated coreless coil. The at least one cooling member has in its base end portion a fluid passage for enabling coolant to flow therethrough and at its extreme end portion a plurality of sheet-like protrusions. The plurality of sheet-like protrusions are arranged alongside the part of the circumferential surface of the associated coreless coil with a clearance between each protrusion to the next and are jointed thermally closely with the associated coreless coil at extreme ends thereof.

With this construction, since coolant is fed to the at least one cooling member jointed thermally closely with the coreless coil to be circulated through the fluid passage formed in the at least one cooling member, the heat generated in the coreless coil due to the application of drive current thereto can be removed efficiently. Further, the at least one cooling member is a one-piece component in which the sheet-like protrusions jointed with the coreless coil is integrated with the base end portion in which the coolant flows. This enables the at least one cooling member to be assembled to the stator base easily and quickly, so that there can be attained improvement in manufacturing efficiency and a substantial reduction in cost.

BRIEF DESCRIPTION OF THE DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
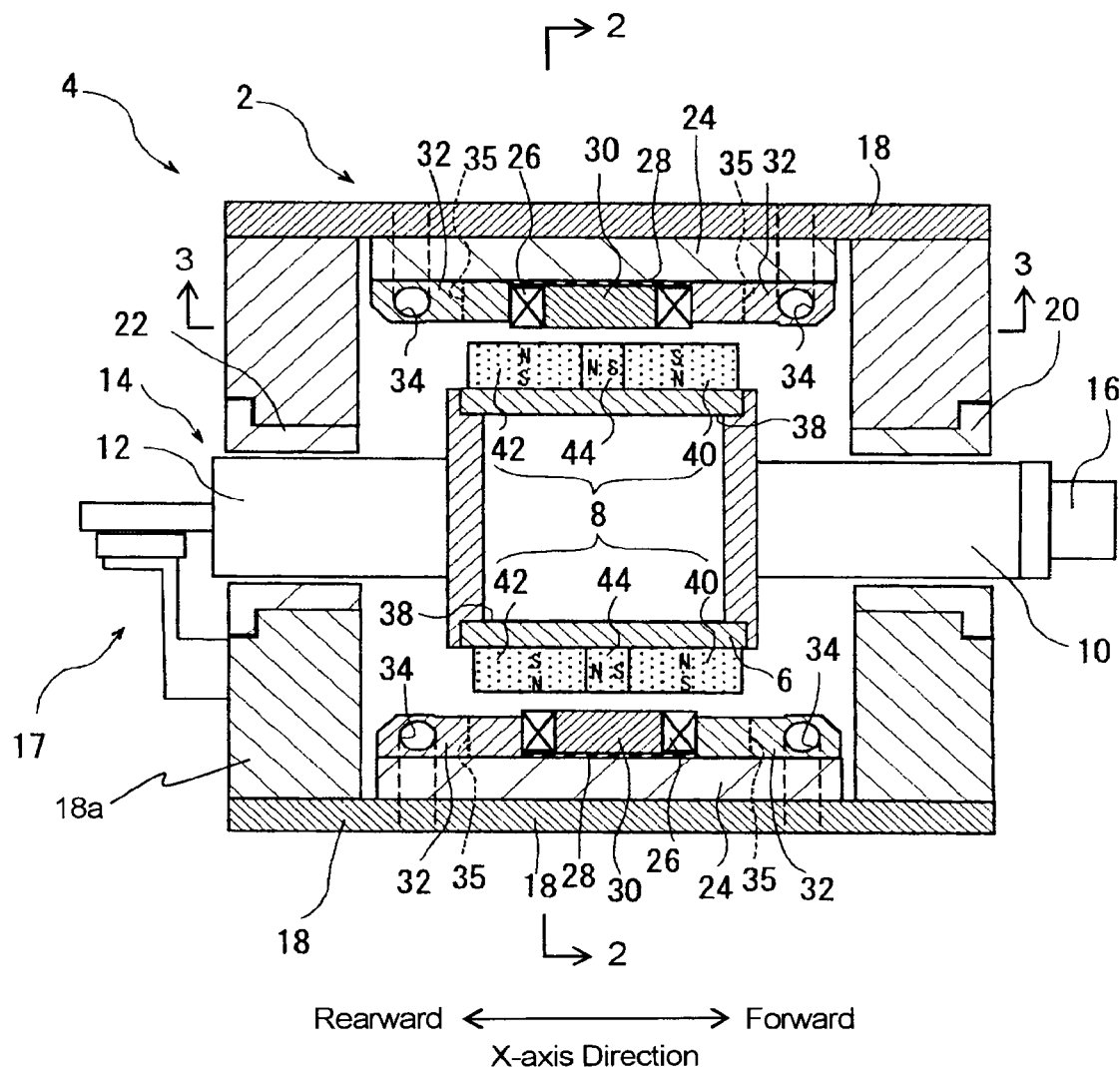
FIG. 1 is a longitudinal sectional view of a moving-magnet type linear motor in one embodiment according to the present invention.
Figure 2:
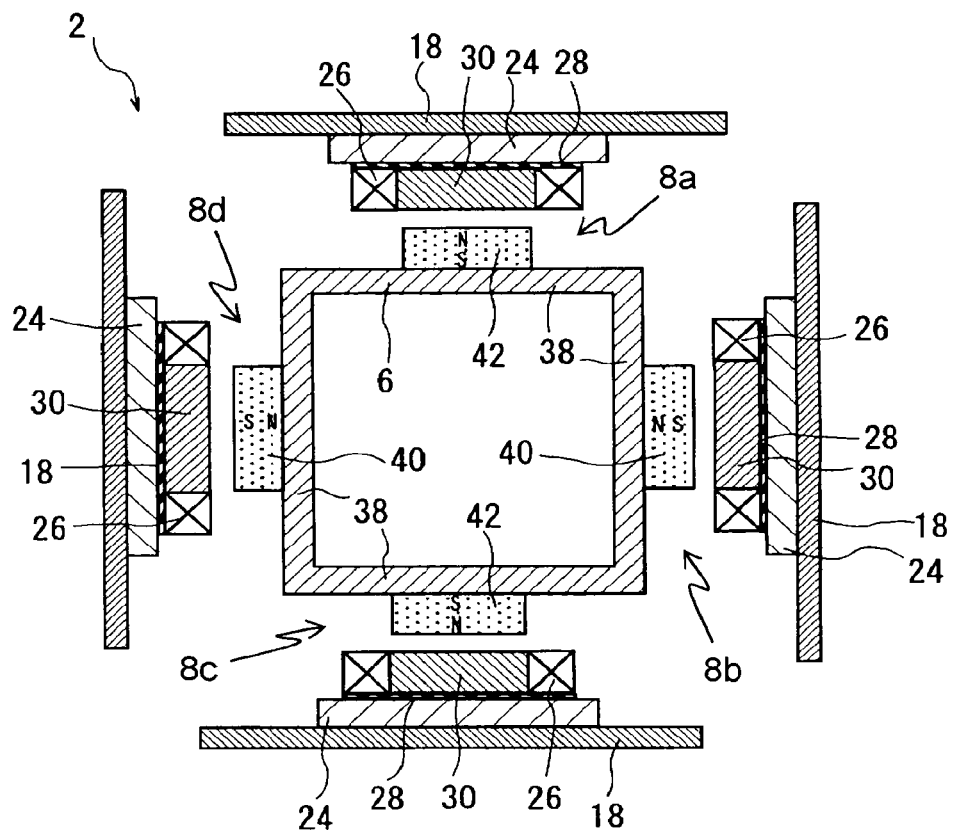
FIG. 2 is a cross-sectional view of the linear motor taken along the line 2-2 in FIG. 1.

Hereafter, a tool moving device with a moving-magnet type linear motor in one embodiment according to the present invention will be described with reference to the accompanying drawings. FIG. 1 is a longitudinal sectional view showing the construction of the tool moving device, and FIG. 2 is a cross-sectional view taken along the line 2-2 in FIG. 1. The linear motor designated by reference numeral 2 is composed of primary components on a stationary side and secondary components on a moving side movable relative to the primary components.

As shown in FIG. 1, the tool moving device designated by reference numeral 4 is provided with a movable body 14, which is composed of a magnet yoke 6 taking the shape of a hollow or empty box made of a magnetic material such as, e.g., iron or steel, a plurality of magnet constructs 8a-8d (collectively designated as 8 from time to time) made of permanent magnets attached to the circumferential surface of the magnet yoke 6, and a pair of support portions 10, 12 rectangular in cross-section which are respectively attached to opposite opening portions of the magnet yoke 6. The movable body 14 constitutes the secondary components of the linear motor 2. A tool holder unit 16 holding a bite or the like (not shown) for machining a workpiece precisely is attached to an extreme end (forward end) of one of the support portions 10 of the movable body 14. A linear scale (position sensor) generally indicated by reference numeral 17 is attached to an extreme end (rearward end) of the other support portion 12 and detects the moving position of the movable body 14 relative to support bases 18 referred to below.

Further, the tool moving device 4 is provided with the support bases 18 made of, e.g., a nonmagnetic material. The support bases 18 are fixedly mounted, relative to which the movable body 14 is movable. As shown in FIG. 2, the support bases 18 are assembled to surround the movable body 14 by jointing flat wall portions with one another by a frame member 18a (FIG. 1) made of a magnetic material such as, e.g., steel. The flat wall portions respectively face four surfaces at an axial mid portion of the movable body 14. The frame member 18a is provided with a pair of forward and rearward fluid bearings 20, 22 which support the respective support portions 10, 12 of the movable body 14 to be slidable only in an X-axis direction (i.e., in the axial direction of the movable body 14) through a static pressure of fluid like oil. The support bases 18 respectively mount thereon four coil yokes 24 and four coreless coils 26. The coil yokes are made of a magnetic material such as, i.e., iron or steel and are arranged to surround the magnet yoke 6. The coreless coils 26 are respectively attached to inner wall surfaces of the coil yokes 24 to face the respective magnet constructs 8a-8d each with a clearance relative to the associated magnet construct 8. Each coreless coil 26 is made by winding a flat type wire many turns into a lamination state and takes a configuration that a conductive wire layer made of copper and an insulation layer thereof of each turn are contiguously piled on those of the turn thereunder, so that the thermal resistance of the coil 26 is small.

Figure 8:
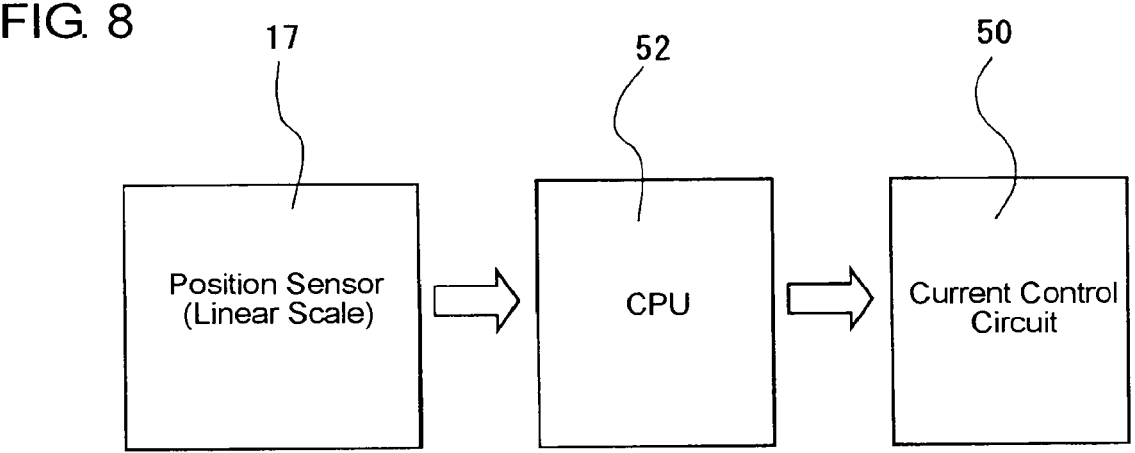
FIG. 8 is a block diagram of control components for controlling the moving position of the movable body.
Figure 4:
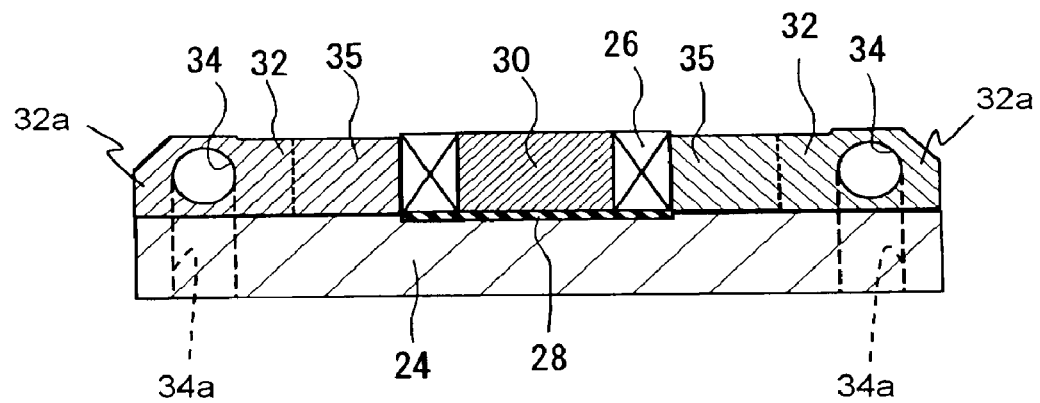
FIG. 4 is a sectional view taken along the line 4-4 in FIG. 3.
Figure 5:
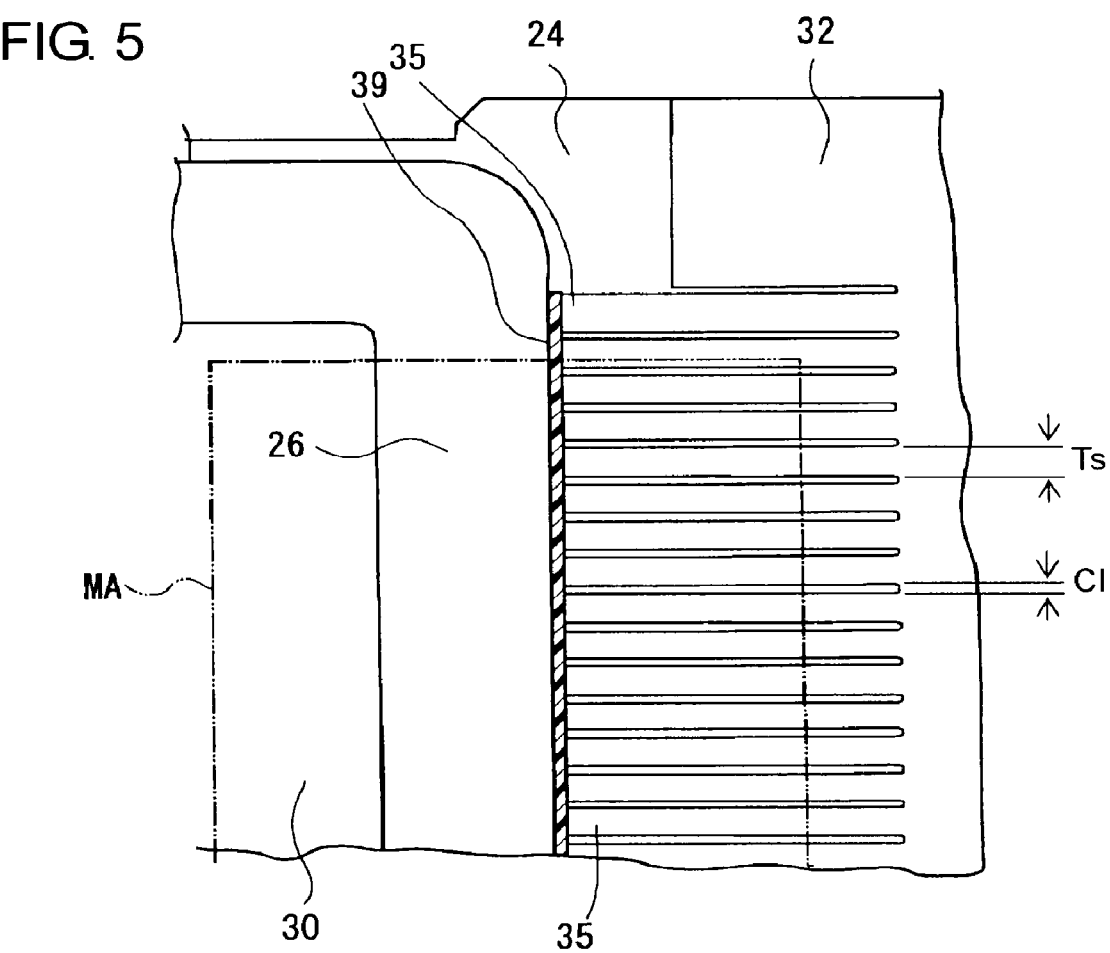
FIG. 5 is an enlarged fragmentary view of a part shown in FIG. 3.

Further, as shown in FIG. 5, the circumferential surface of each coreless coil 26 is formed to be nearly flat at opposite end surface portions thereof spaced in the moving direction (i.e., X-axis direction) of the movable body 14. A plurality of thin comb plate or sheet-like protrusions 35 of each cooling member or block 32 are adhered with high heat conductive adhesive at their extreme ends to each of the opposite flat end surfaces of each coreless coil 26. Each coreless coil 26 is made by winding the flat type wire many turns around a bobbin 30 made of, e.g., glass epoxy into a rectangular wire-path form as viewed in FIG. 3. As shown in FIG. 4, an insulator plate 28 made of, e.g., glass epoxy is interposed between a bottom surface of each coreless coil 26 and an associated coil yoke 24 for electrical isolation therebetween. The coil yokes 24 and the coreless coils 26 respectively attached thereto constitute the primary components of the linear motor 2. The coreless coils 26 are electrically connected to a current control circuit 50 (refer to FIG. 8) which is connected to a direct current power supply (not shown). As shown in FIG. 8, the current control circuit 50 receives a control signal which a controller (CPU) 52 outputs in dependence on the signal from the linear scale 17, and controls the electric current applied from the direct current power supply to each coreless coil 26. The current control circuit 50 may be constituted by an amplifier which is composed of switching elements like, e.g., IGBTs (Integrated Gate Bipolar Transistors) and other elements.

Figure 3:
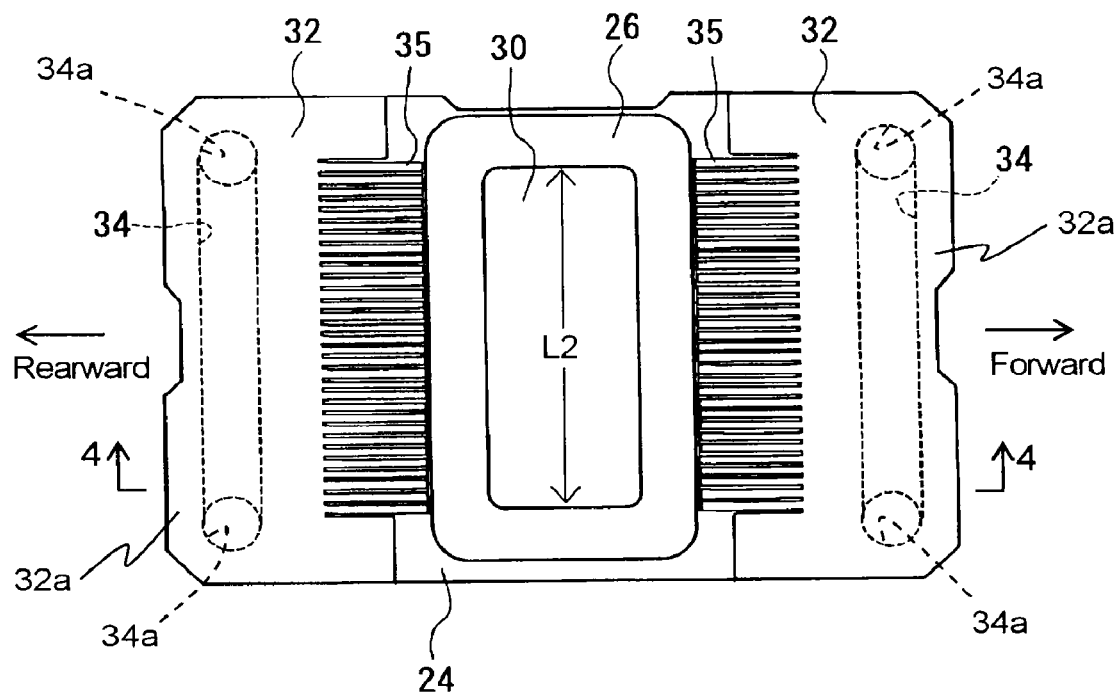
FIG. 3 is a view taken along the line 3-3 in FIG. 1, showing the state of attaching each coreless coil to a cooling block therefor.

As shown in FIGS. 1, 3 and 4, each coil yoke 24 mounts thereon a pair of cooling blocks 32 as cooling members, which are arranged at two places spaced in the X-axis direction in contact with the opposite flat end surfaces of the associated coreless coil 26. The cooling blocks 32 are made of, e.g., copper and are secured to the coil yoke 24 by means of bolts or the like (not shown), with their base end portions 32a positioned on opposite end sides in the X-axis direction. Fluid passage 34 each for flowing coolant (e.g., cooling water) therethrough in the direction perpendicular to the X-axis direction are formed respectively at the based end portions 32a of the cooling blocks 32. Each flow passage 34 communicates with a cooling pipe and a pump (both not shown) through perforation ports 34a formed at both ends thereof. As best shown in FIG. 5, the plurality of sheet-like protrusions 35 each with a clearance Cl relative to the next thereto are formed at its extreme end portion of each cooling block 32 on the side of the associated coreless coil 26 and are arranged alongside each of the forward and rearward flat end surfaces of each coreless coil 26 in a juxtaposed relation like comb teeth. Respective extreme ends of the sheet-like protrusions 35 are formed to follow the associated flat end surface of the coreless coil 26 and are jointed therewith with the high heat conductive adhesive 39 for heat conduction.

Figure 6:
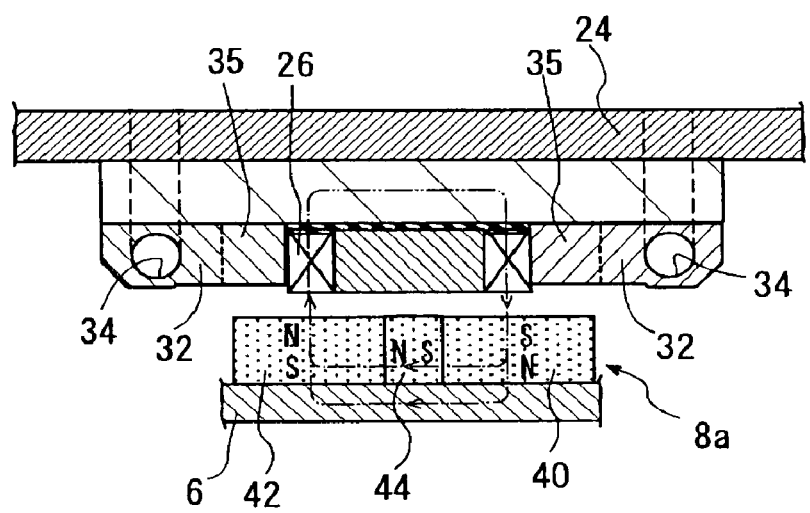
FIG. 6 is an enlarged fragmentary view of a part shown in FIG. 1, illustrating lines of magnetic flux between each magnet construct and an associated coreless coil.

Further, the magnet yoke 6 is of a polygonal cylinder and, in the illustrated embodiment, takes the form of a tetragonal cylinder having four flat walls 38 in the circumferential direction. As shown in FIGS. 2 and 6, first to fourth magnet constructs 8a-8d are respectively attached to the outer surfaces of the flat walls 38. Each of the magnet constructs 8a-8d is composed of three permanent magnets including two magnets 40, 42 for formation of magnetic flux and one additional magnet 44 interposed in contact therebetween in the X-axis direction for conduction of the magnetic flux. Herein, for convenience in explanation, each permanent magnet 40 attached with its N-pole in contact with the outer surface of the associated flat wall 38 will be called "first" permanent magnet, whereas each permanent magnet 42 attached with its S-pole in contact with the outer surface of the associated flat wall 38 will be called "second" permanent magnet. It is to be noted that the first and second permanent magnets 40, 42 are identical in configuration and dimension, but are distinguished from each other solely by reason of whether the magnetic pole held in contact with the magnet yoke 6 is N-pole or S-pole. Each of the first and second permanent magnets 40, 42 is made of a rare-earth metal and is formed into the shape of a rectangular parallelepiped. The permanent magnets 40, 42 are arranged to orient the attraction direction in a direction normal to the X-axis direction.

Figure 7:
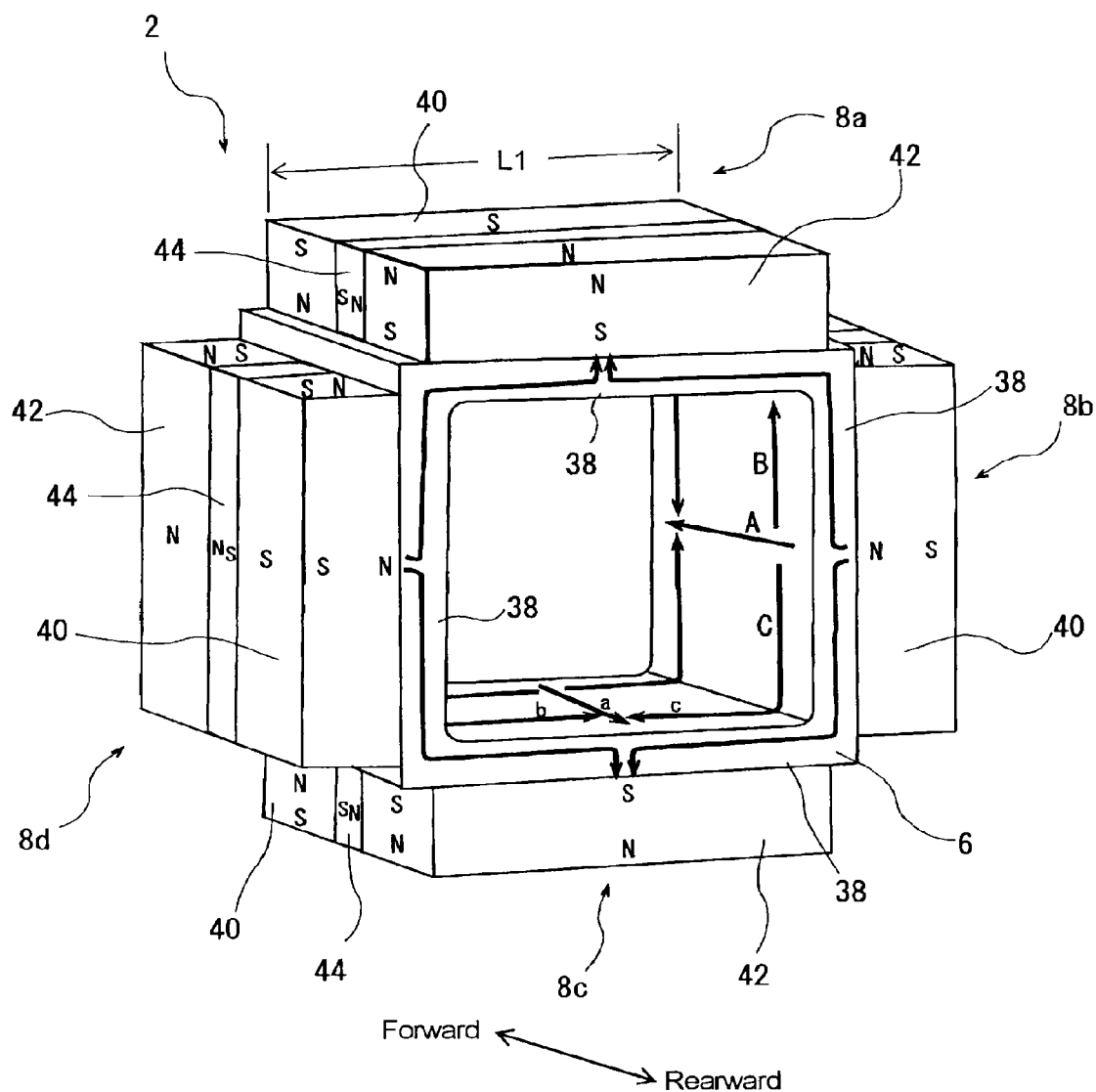
FIG. 7 is a schematic view of a magnet yoke, illustrating lines of magnetic flux in the magnet yoke.

As best shown in FIG. 7, the first to fourth magnet constructs 8a-8d are arranged in turn clockwise as viewed from the rear side toward the forward side in the X-axis direction. Thus, the first magnet construct 8a is radially opposed to the third magnet construct 8c, while the second magnet construct 8b next to the first magnet construct 8a in the counterclockwise direction as viewed in FIG. 7 is radially opposed to the fourth magnet construct 8d next to the first magnet construct 8a in the clockwise direction. Specifically, the first permanent magnet 40 of each magnet construct 8 is attached with its N-pole in contact with the outer surface of the associated flat wall 38 and with its S-pole facing the associated coreless coil 26, whereas the second permanent magnet 42 of each magnet construct 8 is attached with its S-pole in contact with the outer surface of the associated flat wall 38 and with its N-pole facing the associated coreless coil 26. The first and second permanent magnets 40, 42 take the form of a rectangular parallelepiped. The auxiliary permanent magnet 44 interposed in contact between the first and second permanent magnets 40, 42 of each magnet construct 8 takes the form of a rectangular parallelepiped and is arranged to orient the attraction direction in parallel with the X-axis direction.

As best shown also in FIG. 7, the first and third magnet constructs 8a, 8c place the first permanent magnets 40 on the forward side and the second permanent magnets 42 on the rearward side in the X-axis direction. Conversely, the second and fourth magnet constructs 8b, 8d place the second permanent magnets 42 on the forward side and the first permanent magnets 40 on the rearward side in the X-axis direction. That is, regarding the arrangement of the first and second permanent magnets 40, 42 and the auxiliary permanent magnet 44 in the X-axis direction, the first magnet construct 8a is identical with the third magnet construct 8c, and the second magnet construct 8b is identical with the fourth magnet construct 8d. However, the arrangement of the first and second permanent magnets 40, 42 in the first and third magnet constructs 8a, 8c is opposite to that of the first and second permanent magnets 40, 42 in the second and fourth magnet constructs 8b, 8c.

Further, each auxiliary magnet 44 of the first and third magnet constructs 8a, 8c is secured with its S-pole on the forward side (on the right side as viewed in FIGS. 1 and 6) and its N-pole on the rearward side (on the left side as viewed in FIGS. 1 and 6), whereas each auxiliary magnet 44 of the second and fourth magnet constructs 8b, 8d is secured with its N-pole on the forward side and its S-pole on the rearward side. Thus, each auxiliary magnet 44 of the first and third magnet constructs 8a, 8c is opposite in magnetic polarities at the ends in the X-axis direction to each auxiliary magnet 44 of the second and fourth magnet constructs 8b, 8d. By arranging each auxiliary magnet 44 in this manner, as typically illustrated in FIG. 6, it becomes possible to prevent the magnetic flux from leaking and to increase the lines of magnetic flux which go across the coreless coil 26, whereby it can be realized to generate a great or powerful propelling force.

Further, as best shown in FIG. 7, the auxiliary magnets 44 of the first to fourth magnet constructs 8a-8d are at the same position on the magnet yoke 6 in the X-axis direction, and the first and second permanent magnets 40 and 42 in each magnet construct 8 are at the opposite sides of each auxiliary magnet 44 in contact therewith. That is, at each of respective axial positions spaced with the auxiliary magnet 44 therebetween, the first and second permanent magnets 40, 42 are arranged circumferentially in an alternate fashion, and each first permanent magnet 40 and the second permanent magnets 42 arranged next thereto in the circumferential direction at the same axial position are opposite to each other with respect to the magnetic pole contacting the flat wall 38. In other words, at a first position on the magnet yoke 6 in the X-axis direction, the first to fourth magnet constructs 8 have the first and second permanent magnets 40, 42 arranged circumferentially in an alternate fashion, and at a second position on the magnet yoke 6 spaced rearward by a predetermined distance from the first position in the X-axis direction, the first to fourth magnet constructs 8 have the second and first permanent magnets 42, 40 arranged circumferentially in an alternate fashion. Therefore, as depicted by the arrows in FIG. 7, the magnetic flux generated from each first permanent magnet 40 is divided to go through the magnet yoke 6 to two second permanent magnets 42 next thereto in the circumferential direction as well as to one second permanent magnet 42 next thereto in the axial direction, as will be described hereafter in greater detail.

Further, in the present embodiment, as understood from FIG. 7, the first and second permanent magnets 40, 42 and the auxiliary permanent magnet 44 are identical in length in the direction normal to the X-axis direction. In the length in the X-axis direction, the first and second permanent magnets 40, 42 are identical but are longer than the auxiliary magnet 44. Particularly, in order to prevent any side force from being generated by the errors involved in attaching the permanent magnets 40, 42, 44 and the coreless coils 26, the permanent magnets 40, 42, 44 are made to be sufficiently shorter in the length in the direction perpendicular to the X-axis direction than the coreless coils 26. That is, in the direction perpendicular to the X-axis direction, the length L1 of the permanent magnets 40, 42, 44 is made to be shorter than the inner side length L2 (cf. FIG. 3) of each coreless coil 26 to make the relation of L1<L2. However, in a modified form wherein importance is placed on the generation of a higher or more powerful propelling force, the length L1 of the permanent magnets 40, 42, 44 may be made to be longer in the direction perpendicular to the X-axis direction than the inner side length L2 of the coreless coils 26 (that is, L1>L2).

(Operation)

The operation of the moving-magnet type linear motor 2 as constructed above will be described hereafter. When electric current is applied to each coreless coil 26 to flow clockwise as viewed from the side of the magnet yoke 6, a force toward the forward side (i.e., toward the right as viewed in FIGS. 1 and 6) is generated from each coreless coil 26 in accordance with Fleming's left hand rule, and in reaction to the forward force, a counter-force toward the rearward side (toward the left as viewed in FIGS. 1 and 6) is exerted on the first magnet construct 8a. Likewise, regarding other magnet constructs 8b-8d, by applying electric current to the coreless coils 26 which respectively face the magnet constructs 8b-8d, a propelling force toward the rearward side is exerted on the magnet yoke 6, whereby the magnet yoke 6 is moved by a distance depending on the applied electric current toward the rearward side (i.e., toward the left as viewed in FIGS. 1 and 6). Conversely, when the coreless coils 26 are applied with electric current in opposite or counterclockwise direction of the current flow by controlling the IGBTs provided in the current control circuit 50, the magnet yoke 6 is moved toward the right as viewed in FIGS. 1 and 6. The moving position of the magnet yoke 6 is detected by the linear scale 17, and a signal indicative of the detected position is fed to the CPU 52, whereby the amount of the electric current and the direction in which the electric current is applied are determined by the IGBTs to control the moving amount of the magnet yoke 6. In this way, the movable body 14 constituted by the magnet yoke 6 is moved in the X-axis direction in dependence on the direction in which the electric current is applied, as well as on the magnitude of the applied electric current, and the moving position of the movable body 14 is controlled by reference to the detection signal from the linear scale 17. As a consequence, the tool holder unit 16 attached to the movable body 14 and the bite or the like held on the tool holder unit 16 are bodily moved finely at a high speed in the X-axis direction, whereby a workpiece (not shown) can be machined precisely. Since the movable body 14 is supported by the fluid bearings 20, 22 through a static hydraulic pressure during the movement, the position control of the bite or the like can be performed finely and stably at a high speed, so that the machining accuracy of the workpiece can be enhanced.

In the present embodiment, while the linear motor 2 is driven with electric current applied to the coreless coils 26, coolant (cooling water) is fed from the pump to the cooling blocks 32 which are jointed with the high heat conductive adhesive to each coreless coil 26 closely in terms of heat conduction, to circulate through the flow passages 34 formed in the cooling blocks 32. Thus, heat generated by the drive current in each coreless coil 26 can be removed efficiently. Each cooling block 32 is a one-piece component in which the fins or sheet-like protrusions 35 in contact with the coreless coil 26 are integrated with the base end portion 32a in which the coolant flows. This enables each cooling block 32 to be assembled to the coil yoke 24 easily and quickly, so that there can be attained improvement in manufacturing efficiency and a substantial reduction in cost. Further, as shown in FIG. 5, the magnetic flux which is generated from each magnet construct 8a, 8b, 8c or 8d to traverse the coreless coil 26 also traverses the cooling block 32 within an area MA in which the plurality of sheet-like protrusions or fins 35 are arranged alongside each end surface in the X-axis direction. Within the area MA, each sheet-like protrusion 35 has a thickness Ts which is thin in the direction that traverses the magnetic flux. This prevents strong eddy current from being generated as resistance against the propelling force, whereby it becomes possible to apply a powerful propelling force to the movable body 14 efficiently.

As mentioned earlier, the first permanent magnet 40 of each magnet construct 8 is secured in contact at its N-pole side with the associated flat wall 38, while the second permanent magnet 42 of each magnet construct 8 is secured in contact at its S-pole side with the associated flat wall 38. As typically illustrated in FIG. 7 with respect to the second magnet construct 8b, the magnetic flux generated from the first permanent magnet 40 of each magnet construct 8 are branched into two directions B and C along the circumferential surface of the magnet yoke 6 as well as one direction A perpendicular to the directions B and C. That is, the lines of the magnetic flux along two directions B and C move in the circumferential direction of the magnet yoke 38 from the N-pole of the first permanent magnet 40 of each magnet construct, e.g., 8b or 8d to the S-poles of the second permanent magnets 42 of the magnet constructs, e.g., 8a and 8c which are the next to each such magnet construct, e.g., 8b or 8d in the circumferential direction. On the other hand, the line of the magnetic flux along the direction A moves in the X-axis direction (in the axial direction of the magnet yoke 6) from the N-pole of the first permanent magnet 40 of each magnet construct, e.g., 8b or 8d to the S-pole of the second permanent magnet 42 of the same magnet construct, e.g., 8b or 8d which is next to the first permanent magnet 40 in the X-axis direction.

In other words, the magnetic polarities of the first and second permanent magnets 40, 42 of each magnet construct 8a, 8b, 8c, 8d are set so that magnetic flux from the first permanent magnet 40 of each magnet construct, e.g., 8b is branched into three lines A, B, C, one line A of which moves to the second permanent magnet 42 next thereto in the axial direction of the same magnet construct, e.g., 8b and two other lines B, C of which respectively move to the second permanent magnets 42 of the magnet constructs, e.g., 8a, 8c which are next thereto on the both sides in the circumferential direction.

As a consequence, it can be realized to make the thickness of the magnet yoke 6 as thin as one third ($\frac{1}{3}$) or so of that in the prior art linear motor without providing the magnet yoke 6 with a low saturated density of magnetic flux. Thus, although being of a moving-magnet type, the linear motor 2 can be downsized and lightened in weight. This advantageously results in enhancing the responsiveness and the positioning accuracy of the movable body 14. Further, the three lines A, B, C of magnetic flux branched from the N-pole of each first permanent magnet 40 respectively pass through the S-poles of three different second permanent magnets 42. On the contrary, three lines (indicated as "a, b and c") of magnetic flux from the N-poles of three different first permanent magnets 40 pass as one bundle of the lines a, b and c through the S-pole of each second permanent magnet 42, as typically depicted as those moving to the second permanent magnet 42 of the third magnet construct 8c. Therefore, since the branching does not cause the magnetic flux going across each coreless coil 26 to decrease in density, a powerful propelling force can be obtained though the magnet yoke 6 can be lightened in weight.

(Modifications)

Each cooling block 32 is provided to be jointed with the forward or rearward end portion of each coreless coil 26 which portion extends perpendicular to the X-axis direction. In a modified form, it may be provided to be jointed with each of the lateral end portions which extend in parallel to the X-axis direction. In this modified form, there may be taken a configuration that each cooling block 32 is arranged out of the moving range of an associated magnet construct 8 not to be traversed by the magnetic flux generated therefrom.

Further, the flat type wire is employed to form the coreless coils 26 in the present embodiment. The present invention is not limited to the employment of the flat type wire. There may be used a wire round in cross-section, for example. In this modified form, high heat conductive members like the cooling blocks 32 may be used and formed at its extreme end to follow at least pars of the circumferential surface of each coreless coil 26 which is made by winding the wire many turn into a laminated form.

The cooling blocks 32 may not be made of copper and instead, may be made of any non-magnetic material which is high in thermal conductivity.

The magnet yoke 6 is not limited to be a tetragonal cylinder. For example, it may be any of polygonal cylinders which have outer surfaces of even number such as, for example, hexagon, octagon and the like. For an increase in strength of the magnet yoke having even-number outer surfaces, the magnet yoke 6 may take a configuration that one or more beams are provided in the hollow or empty space inside thereof.

The present embodiment takes the configuration that the auxiliary permanent magnet 44 is interposed between the first and second permanent magnets 40, 42 in each magnet construct 8. However, another modified form may take a configuration that no auxiliary magnet is interposed between the first and second permanent magnets 40, 42.

The plurality of coil yokes 26 are individually attached to the interior surfaces of the support bases 18. In a further modified form, there may be used a single magnet yoke which may take an even-number polygonal shape corresponding to the shape of the magnet yoke 6.

Various features and many of the attendant advantages in the foregoing embodiment will be summarized as follows:

In the foregoing embodiment typically shown in FIGS. 1 and 3, since coolant is fed to each cooling member (i.e., cooling block) 32 jointed thermally closely with the coreless coil 26 to be circulated through the fluid passage 34 formed in the cooling member 32, the heat generated in the coreless coils 26 due to the application of drive current thereto can be removed efficiently. Further, each cooling member 32 is a one-piece component in which the portion (i.e., sheet-like protrusions) 35 jointed with the coreless coil 26 is integrated with the base portion 32a in which the coolant flows. This enables each cooling member 32 to be assembled to the coil yoke 24 easily and quickly, so that there can be attained improvement in manufacturing efficiency and a substantial reduction in cost.

Also in the foregoing embodiment typically shown in FIGS. 1 and 3, the plurality of sheet-like protrusions 35 which are formed on each cooling member 32 to be arranged alongside a part of the circumferential surface of each coreless coil 26 reside partly within the area MA (FIG. 5) in which the magnetic flux from each magnet construct 8 goes across the coreless coil 26 also goes across the cooling member 32, and each of the sheet-like protrusions 35 traversing the magnetic flux is small in thickness Ts. Therefore, there is not generated strong eddy current which otherwise acts as resistance against the propelling force applied to the movable member 14, so that it can be realized to make the magnet yoke 6 generate a powerful propelling force efficiently.

Also in the foregoing embodiment typically shown in FIG. 7, the magnetic flux which is generated from the magnetic pole of the first permanent magnet 40 moves to magnets poles which are opposite in magnetic polarity to the magnetic pole and which are next thereto in the circumferential direction as well as in the axial direction, whereby the magnetic flux can be branched into two circumferential directions B, C as well as into one axial direction A. That is, the magnetic flux from each first permanent magnet 40 can be distributed into three lines A, B and C. Therefore, it can be realized to make the thickness of the magnet yoke 6 thin without providing the magnet yoke 6 with a low saturated density of magnetic flux. Thus, although being of a moving-magnet type, the linear motor 2 can be downsized and lightened in weight. This advantageously results in enhancing the responsiveness and the positioning accuracy of the movable body 14. Further, the three lines A, B and C of magnetic flux branched from one N-pole of the first permanent magnet 40 of each magnet construct 8 respectively go to the S-poles of three second permanent magnets 42. On the contrary, the three lines of magnetic flux from the N-poles of three different first permanent magnets 40 go to the S-pole of one different second permanent magnet 42 as one bundle of the lines a, b and c as depicted in FIG. 7. Therefore, since the branching does not cause the magnetic flux going across each coreless coil 26 to decrease in density, a powerful propelling force can be obtained with the magnet yoke 24 being light in weight.

Obviously, numerous further modifications and variations of the present invention are possible in light of the above teachings. It is therefore to be understood that within the scope of the appended claims, the present invention may be practiced otherwise than as specifically described herein.

What is claimed is:

1. A moving-magnet type linear motor comprising:
   a magnet yoke forming an even-number polygonal cylinder with a plurality of flat walls and movable in the axial direction of the even-number polygonal cylinder;
   a plurality of magnet constructs respectively attached to outer surfaces of the flat walls of the magnet yoke and composed of a plurality of permanent magnets;
   a stator base provided to surround the magnet yoke;
   a plurality of coreless coils attached to the stator base and arranged to respectively face the plurality of magnet constructs each with a magnetic clearance relative to the associated magnet construct; and
   at least one cooling member attached to the stator base each to follow a part of circumferential surface of the associated coreless coil and allowing coolant to flow inside for cooling the associated coreless coil;
   wherein the at least one cooling member has in its base end portion a fluid passage for enabling coolant to flow therethrough and at its extreme end portion a plurality of sheet-like protrusions, and
   wherein the plurality of sheet-like protrusions are arranged along the part of the circumferential surface of the associated coreless coil with a clearance between each protrusion to the next and are jointed thermally closely with the associated coreless coil at extreme ends thereof.

2. The moving-magnet type linear motor as set forth in claim 1, wherein:
   the at least one cooling members is jointed with the circumferential surface of the coreless coil at a part extending in a direction normal to the axial direction of the even-number polygonal cylinder; and
   the length of the sheet-like protrusions in the axial direction is set so that the area by which each of the magnet constructs attached to the magnet yoke comes out of the associated coreless coil on the side of the at least one cooling member remains in the area in which the at least one cooling member has the plurality of sheet-like protrusions.

3. The moving-magnet type linear motor as set forth in claim 1, wherein:
   the at least one cooling member comprises two cooling members arranged at both sides of each coreless coil in the axial direction;
   the length in the axial direction of the sheet-like protrusions of each cooling member is set so that each of the magnet constructs attached to magnet yoke does not go beyond the area of the sheet-like protrusions of either cooling member when the magnet yoke is moved in either of forward and rearward directions in the axial direction.

4. The moving-magnet type linear motor as set forth in claim 1, wherein each of the magnet constructs comprises:

a first permanent magnet arranged to extend in a direction normal to the X-axis direction and attached to the magnet yoke at one of N and S-poles; and a second permanent magnet arranged in parallel to the first permanent magnet and attached to the magnet yoke at the other of the N and S-poles with a predetermined space from the first permanent magnet in the axial direction; and wherein the first and second permanent magnets of each magnet construct are in alignment respectively with the second and first permanent magnets of another magnet construct adjoining in the circumferential direction so that each magnet construct is opposite in magnetic polarities of the first and second permanent magnets to the magnet constructs which adjoin thereto on both sides in the circumferential direction of the magnet yoke.

5. The moving-magnet type linear motor as set forth in claim 1, wherein:

each of the magnet constructs has first and second permanent magnets which are attached to the magnet yoke to extend in a direction normal to the axial direction in parallel relation with a predetermined space therebetween in the axial direction; and the magnetic polarities of the first and second permanent magnet of each magnet construct are set so that magnetic flux from the first permanent magnet of each magnet construct is branched into three lines, one line of which moves to the second permanent magnet next thereto in the axial direction of the same magnet construct and two other lines of which respectively move to second permanent magnets of the magnet constructs which are next thereto on the both sides in the circumferential direction.

6. The moving-magnet type linear motor as set forth in claim 1, wherein:

the magnet constructs have respective permanent magnets circumferentially aligned at a first position in the axial direction and respective permanent magnets circumferentially aligned at a second position spaced a predetermined distance from the first position in the axial direction;

the permanent magnets circumferentially aligned at each of the first and second positions in the axial direction are alternate in magnetic polarity; and the permanent magnets spaced in the axial direction of each magnet construct are opposite to each other in magnetic polarity.

* * * * *